United States Patent
Mennesson

[15] 3,655,015
[45] Apr. 11, 1972

[54] DISC BRAKES CONTROLLED BY BOWDEN CABLES

[72] Inventor: Bernard Rene Mennesson, Neuilly sur Seine, France

[73] Assignee: Societe D'Appareils De Controle Et D'Equipement Des Moleurs S.A.C.E.M.

[22] Filed: Sept. 25, 1969

[21] Appl. No.: 861,060

[30] Foreign Application Priority Data

Sept. 30, 1968 France....................................168137

[52] U.S. Cl..............................188/71.7, 188/2 B, 188/26, 188/72.1, 188/196 M
[51] Int. Cl........................................................F16d 65/38
[58] Field of Search..................188/20, 26, 71.7, 72.6, 72.9, 188/72.1, 196 M

[56] References Cited

UNITED STATES PATENTS

| 1,869,562 | 8/1932 | Huck | 188/196 M UX |
| 3,109,517 | 11/1963 | Butler et al. | 188/72.6 X |
| 3,425,520 | 2/1969 | Frigger | 188/72.6 X |

FOREIGN PATENTS OR APPLICATIONS 76,617  10/1959  France.......................................188/26

Primary Examiner—George E. A. Halvosa
Attorney—Fleit, Gipple & Jacobson

[57] ABSTRACT

A disc brake for a cycle is actuated by a drum around which a control cable is wrapped. The cable is anchored to the drum by releasable clamping means.

10 Claims, 2 Drawing Figures

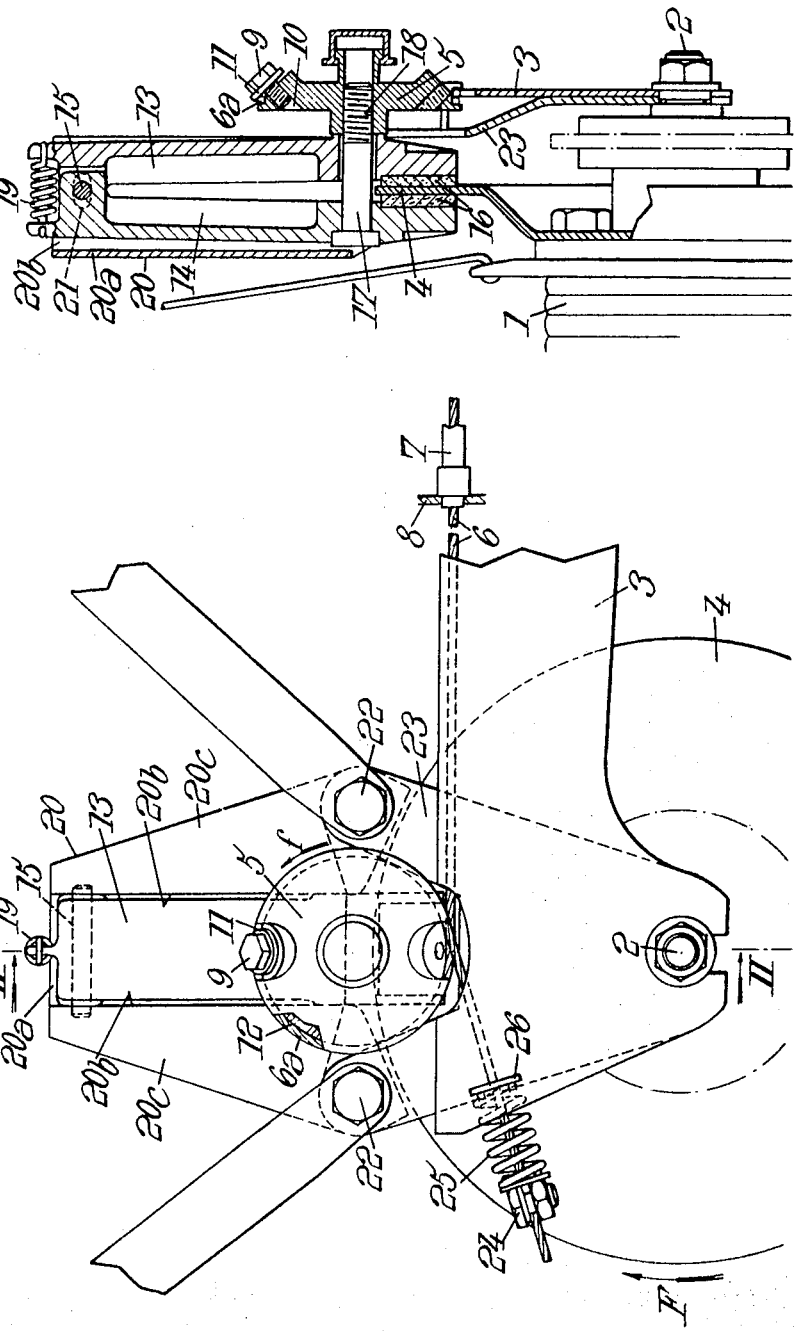

DISC BRAKES CONTROLLED BY BOWDEN CABLES

The invention relates to a disc brakes of the type operated by a rotary member moved by means of a Bowden cable control, and more particularly, since this application appears the most useful, to disc brakes for cycles, especially motor assisted cycles.

The principal object of the invention is to made brakes of this type simple and economical in construction and easy to adjust.

To this end, the disc brake of the type described is characterized in that the rotary member is in the form of a drum to which a portion of the control cable, which is wrapped round this drum through an angle at least equal to the angle of rotation imparted to the drum during braking, is anchored by releasable clamping means, in such a way that the brake can be adjusted, after the clamping means have been released, by sliding the portion of cable on the drum and re-anchoring the cable with the said means.

The invention will, in any case, be better understood from the following description and the accompanying drawings, relating to a preferred embodiment.

FIG. 1 of the drawings is a partial elevation of a disc brake embodying the invention; and FIG. 2 shows the same brake in vertical section along the line II—II in FIG. 1.

A disc brake for a motor assisted cycle, of which only those components necessary to comprehension of the invention, that is to say, the hub 1 of one wheel, the axle 2 of this wheel and part of the frame 3, are shown, is formed as follows.

As regards the brake as a whole, this is designed in any appropriate manner so that it has a disc 4 attached to the hub 1 and a rotary member 5 moved by means of a Bowden cable control, with a cable 6 and sheath 7. The cable 6 may be bare over a substantial portion of its length, the sheath 7 by stopping at a sheath stop 8 attached to the frame 3.

The rotary member 5 is in the form of a drum or pulley onto which a portion 6a of the cable 6 is anchored by releasable clamping means. This portion 6a is wrapped round the drum through an angle at least equal to the angle of rotation imparted to the drum during braking. In the embodiment illustrated, in which the angular travel of the drum or rotary member 5 is substantially less than 360°, the angle of wrap of the portion 6a is slightly less than 360° (FIG. 1).

Advantageously, the clamping means mentioned above are formed by a screw 9 which is engaged in a tapped hole 10 in the drum 5 and whose head is adapted to clamp the portion 6a, generally by way of a washer 11, in a groove 12 formed in the periphery of the drum 5.

Preferably, the brake is formed of two jaws 13, 14 which are hinged relative to one another on a pivot 15 situated substantially in the plane of the operative portion of the disc 4, and of which the friction surfaces 16 (generally in the form of detachable linings) may be brought closer to or further from the disc by an assembly comprising a threaded rod 17 and a nut whose axis is parallel to that of the disc, the rod 17 being situated as near as possible to the outer edge of the disc. The nut is preferably formed by the drum 5 itself, which, to this end, bears an internal thread 18 adapted to co-operate with the external thread on the rod 17. Between the jaws 13, 14 there is preferably a return spring 19 which tends to release them, and which may a spring anchored to portions of of the jaws projecting beyond the pivot 15 relative to the friction surfaces 16.

Advantageously, in order to support the jaws both statically (when the brake is off) and dynamically (when the brake is on) a support 20 having a U-shaped channel with a base 20a and sides 20b is provided. The jaws 13, 14 are housed together in this channel in such a way that their common pivot 15 passes through the sides 20b, preferably through slots such as 21 running parallel to the rod 17, and their edges, at least locally, are supported in sliding fashion on the sides 20b. This support 20, which may readily be made from bent sheet-metal, may also have two outer wings 20c, which are situated in the same plane and adjoin the respective sides 20b of the channel, these wings 20c serving to fix the support 20, for example by means of bolts 22, to the frame 3 or to an element 23 attached to this frame.

To complete the brake, that end of the cable 6 which runs through the sheath 8 is attached to a grip or lever (not shown), and a stop 24 is anchored to the other end of the cable, a return spring 25 being inserted between this stop and an abutment 26 attached to the frame 3.

The resulting disc brake operates as follows:

Normally, the spring 25 exerts traction on the cable 6, tending to turn the drum 5 in the direction opposite to the arrow $f$ (FIG. 1), that is, in the direction in which the drum is unscrewed relative to the rod 17. The spring 19 holds the surfaces 16 of the disc 4.

During braking, the user exerts traction on the cable 6, overcoming the action of the spring 25 and tending to turn the drum 5 in the direction of the arrow $f$, that is, in the direction in which the drum is screwed along the rod 17. As a result, the disc 4 is clamped between the surfaces 16. The braking force, which tends to drag the jaws 13, 14 towards the right of FIG. 1 when rotation is in the direction indicated by the arrow F, is absorbed by the support 20, through its right-hand side 20b. The shape of the support profile enables it to absorb this stress without being appreciably deformed.

As the surfaces 16 become worn, the amplitude of the rotation to be imparted to the drum 5 in order to put the brake or increases. In order to make the brake more sensitive, this amplitude should be reduced when it exceeds certain limits. This can be done merely by releasing the screw 9 (without touching the stop 24), rotating the drum thereby sliding the cable portion 6a relatively to the groove 12 in the drum 5 until the surfaces 16 just contact the disc 4 without exerting any pressure, and re-tightening the screw 9.

This adjustment is, of course, very easy to carry out. Also, since the stop 24 is permanently attached to the cable 6, it does not have the disadvantages inherent in conventional adjusting arrangements in which, since the stop 24 on the cable end must be released and re-tightened, the cable comes apart so that it breaks and wounds the user.

I claim:

1. In a disc brake operated by the movement of a rotary member rotated by a Bowden cable control bearing stop means, more particularly for cycles and especially for motor assisted cycle, the improvement that the rotary member is in the form of a drum, said stop means being independent of the drum, a portion of the control cable being wrapped around said drum through an angle at least equal to the angle of rotation imparted to the drum during braking, and anchored to the drum, releasable clamping means effecting said anchoring in such a way that the brake can be adjusted without altering said stop means, after the clamping means have been released, by rotating the drum relative to the portion of cable on the drum and re-anchoring the cable with said clamping means.

2. The disc brake specified in claim 1, wherein the clamping means are in the form of a screw which engages a tapped hole in the drum and of which the head is adapted to clamp the cable portion in a groove formed in the periphery of the drum.

3. The disc brake specified in claim 1, wherein the portion of the cable wrapped around the drum is extended on each side of the drum by two bare portions, the first bare portion extending as far as a fixed stop attached to the cycle frame for the cable sheath and the second bare portion bearing a stop anchored to the cable, a return spring being situated between the latter stop and a fixed abutment attached to the cycle frame.

4. The disc brake according to claim 1, wherein said movement of the rotary member is axial.

5. The disc brake specified in claim 1, comprising two jaws which are hinged relative to one another on a pivot situated substantially in the plane of the operative portion of the disc and of which the friction surfaces may be brought closer to and further away from the disc by means of an assembly comprising a threaded rod and a nut whose axis is parallel to that of the disc, wherein the nut is formed by the drum itself which to this end, bears an internal thread adapted to co-operate with the external thread on the rod.

6. The disc brake specified in claim 5, wherein a return spring is positioned between the jaws, this spring tending to release the jaws and being anchored to those portions of the jaws projecting beyond their hinge pivot relative to the friction surfaces.

7. The disc brake according to claim 6, wherein said return spring is a tension spring.

8. The disc brake specified in claim 5, wherein the jaws are mounted on a support with a channel of U-shaped profile, the jaws being housed together in this channel in such a way that their common pivot passes through the sides of the channel, and their edges, at least locally, are supported in sliding fashion on the said sides.

9. The disc brake specified in claim 8, wherein the support has two outer wings situated in the same plane and adjoining the respective sides of the channel, and these outer wings serve to fix the support to the frame of a cycle which is to be braked or to an element attached to this frame.

10. The disc brake according to claim 8, wherein said common pivot passes through slots running parallel to the threaded rod.

\* \* \* \* \*